US006869550B2

(12) United States Patent
Dorfman et al.

(10) Patent No.: US 6,869,550 B2
(45) Date of Patent: Mar. 22, 2005

(54) METHOD OF PRODUCING A PRE-ALLOYED STABILIZED ZIRCONIA POWDER

(75) Inventors: Mitchell R. Dorfman, Smithtown, NY (US); Luis F. Correa, Hicksville, NY (US); Christopher G. Dambra, Ronkonkoma, NY (US); Komal Laul, East Meadow, NY (US); Richard K. Schmid, Melville, NY (US)

(73) Assignee: Sulzer Metco (US) Inc., Westbury, NY (US)

( * ) Notice: Subject to any disclaimer, the term of this patent is extended or adjusted under 35 U.S.C. 154(b) by 189 days.

(21) Appl. No.: 10/008,894

(22) Filed: Dec. 7, 2001

(65) Prior Publication Data

US 2004/0197580 A1 Oct. 7, 2004

Related U.S. Application Data

(60) Provisional application No. 60/254,383, filed on Dec. 8, 2000.

(51) Int. Cl.[7] .................................................. B29B 9/00
(52) U.S. Cl. ........................................... 264/5; 264/13
(58) Field of Search ........................................ 264/5, 13

(56) References Cited

U.S. PATENT DOCUMENTS

| 4,095,003 | A | | 6/1978 | Weatherly et al. ............ 427/34 |
|---|---|---|---|---|
| 5,994,250 | A | * | 11/1999 | Suzuki et al. .................. 501/87 |
| 6,025,034 | A | | 2/2000 | Strutt et al. .................. 427/450 |
| 6,071,554 | A | * | 6/2000 | Isomura et al. ............. 427/125 |
| 6,162,530 | A | | 12/2000 | Xiao et al. ............... 428/292.1 |

OTHER PUBLICATIONS

International Search Report for PCT/US01/47129.

* cited by examiner

Primary Examiner—Christopher A. Fiorilla
(74) Attorney, Agent, or Firm—Hogan and Hartson, L.L.P.

(57) ABSTRACT

A pre-alloyed stabilized zirconia powder suitable for use in thermal barrier applications is formed by alloying zirconia with a stabilizer, such as yttria, and processing the alloyed stabilized zirconia to form a very fine powder. The raw powder is then spray-dried to produce an agglomerated powder having an average particle size suitable for use in spray coating applications. The resulting powder can be used in a thermal-spray application to produce a porous thermal barrier coating having a substantially decreased thermal conductivity when compared to conventional TB coatings, such those produced using plasma-densified powders.

13 Claims, 4 Drawing Sheets

Pre-alloyed YSZ coating A
11.8% Porosity
200x

**HOSP YSZ coating
10.8% Porosity
200x**

**Pre-alloyed YSZ coating A
11.8% Porosity
200x**

Pre-alloyed YSZ coating B
11.0% Porosity
200x

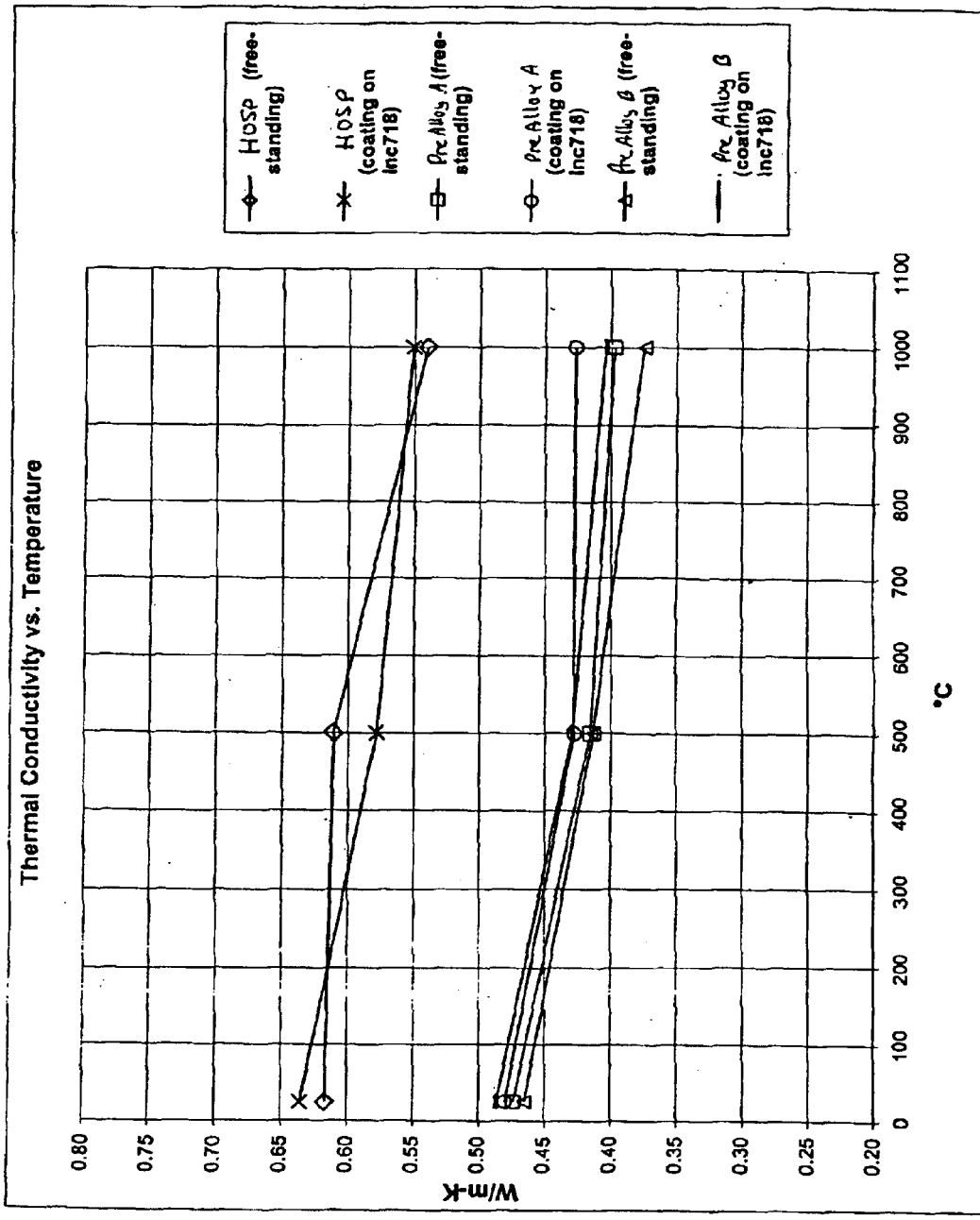

METHOD OF PRODUCING A PRE-ALLOYED STABILIZED ZIRCONIA POWDER

CROSS-REFERENCE(S) TO RELATED APPLICATIONS

The present invention claims priority under 35 U.S.C. § 119 to provisional application Ser. No. 60/2254,383, entitled "Pre-Alloyed YSZ powder" and filed on Dec. 8, 2000. The entire contents of this application are hereby expressly incorporated by reference.

FIELD OF THE INVENTION

The present invention relates to the use of pre-alloyed stabilized zirconia, such as yttria-zirconia, as a raw material to form spray dried powders for use in thermal spray applications of thermal barrier coatings (TBC's) and high temperature abradables.

BACKGROUND OF THE INVENTION

Thermal barrier coatings of alloyed yttria stabilized zirconia are used for many applications in modern turbine engines. A preferred method of producing the TBC is by thermal spraying a yttria+zirconia powder of the proper composition in order to produce a coating of the necessary composition, microstructure, and phase structure. Such powders are generally referred to as YSZ powders. The conventionally preferred types of powders used are spray dried powders agglomerated from separate particles of yttria and zirconia which are then densified by high temperature processing or powders formed by fusing yttria and zirconia and then crushing the alloyed material.

Spray drying is a well-known method of powder agglomeration used to produce food and pharmaceutical products in addition to thermal spray (TS) powders. The key attributes of spray dried products for the TS industry are that they are spherical, have a higher surface area compared to fused and crushed powders, and have low density. This results in powders that offer the benefits of being free flowing and that melt well within conventional thermal spray equipment.

Typically, as in the case of stabilized ceramics for TBC applications, fine particles (such as those having an average particle size of less than about 10 microns) of yttria and zirconia are mixed in water with organic binders and suspension agents to form a slurry. This slurry is then spray dried to create agglomerated particles that can then be applied using various thermal spray techniques to coat an object A shortcoming in the use of separate yttria and zirconia raw materials is that it may result in a chemical inhomogeneity of the powder particles. Even though the bulk concentration of the starting slurry may be correct, various factors such as relative particle size distributions, mixing methods, settling, and spray drying methods among others, may lead to non-uniform distribution of the constituents in the spray-dried particles In order to achieve phase stability, the final coating must contain an alloy of yttria and zirconia. In the case of spray-dry powders, the alloying takes place during the process of thermal spraying or by additional processing of the powder after spray drying but before thermal spraying.

Alloying during the spraying process can be accomplished by applying the powder using a high-temperature thermal spray gun, such as a plasma gun, to ensure that the powder is melted and, by selecting the proper spraying environment to ensure that the powder has time to alloy prior to the cooling that occurs when the powder impacts the surface to be coated. A problem with alloying during thermal spraying is that alloying may not be consistent due to inhomogeneity of the powder, insufficient heat or residence time during the spray process, or variations in the spray process. In addition, non-uniform distribution of the constituents in the spray-dried particles can result in variations in the composition of the applied coating. Further, spray dried powders with individual yttria and zirconia particles above 10 microns in size will also be difficult to alloy. This non-uniform distribution and treatment of the powder may result in non-homogeneous microstructures in the applied coating which have poor or at least inconsistent thermal and mechanical cycling performance.

As a result, even though the previously described spray-dried powders offer certain advantages in thermal spraying, these advantages may be offset under some circumstances by the inconsistent composition and alloying treatment of the particles during spraying.

The need to alloy the powder during thermal spray can be eliminated by performing the alloying step prior to thermal spraying. Conventional techniques to achieve this rely upon plasma densification or sintering of the spray dried powder. One such plasma desnsified powder is currently available as Sulzer Metco 204CNS. This powder is also generally known in the industry as a HOSP powder. Such pre-processing eliminates the variations in the alloying caused by inconsistent treatment of the particles during the thermal spray process. The pre-processing also results in a more structurally stable powder that reduces powder breakdown prior to thermal spray that could prevent the proper alloying of the powder during spraying.

However, this method does not prevent inconsistencies that result from compositional inhomogeneity of each powder particle. The use of plasma densification or sintering adds significant cost to the production of the powder and this processing step is still subject to the inconsistencies in the distribution of the individual particles from the spraydrying. As a result, such powders may still produce coatings with inconsistent properties.

As an alternative to spray-dried and pre-processed powders, fused and crushed powders have been used in the area of thermal spray for TBC applications. Individual yttria and zirconia powders are mixed and fused using an induction arc or other process to produce a briquette of fused material. The briquette is then crushed to produce powder of the desired size suitable for thermal spraying, generally between 11 and 150 microns.

Fused and crushed powders exhibit angular, irregular morphologies. As a result, use of these powders can cause inconsistent powder feeding. In addition, the particles are generally denser and harder to melt. This results in lower deposition efficiency due to insufficient heating of the particles in the thermal spray jet.

SUMMARY OF THE INVENTION

The disadvantages of known YSZ powder production techniques are addressed by the use of a pre-alloyed YSZ powder as a starting material for a spray dried powder. In particular, pre-alloyed cubic/tetragonal yttria-zirconia can be used as the starting raw material for a thermal spray powder produced by spray drying. In a preferred embodiment, pre-alloyed 8% yttria stabilized zirconia is used as a starting material. The yttria can be within a range of 5–25%. In alternative embodiments, various other pre-alloyed ceramics can be used to produce powders suitable for use in both TBC's and abradable coatings. For example, ceria, magnesia, ytterbia scantia, dysprosia, neodyrnia, and calcia can replace or supplement the yttria.

Advantageously, a spray dried powder manufactured from starting materials of pre-alloyed yttria and zirconia produces a homogeneous powder regardless of the variations that occur during the manufacturing of slurries or during the spray drying and even when a wide particle size distribution is used as the starting material. There is also no need to alloy the powder before or during thermal spraying, reducing cost of powder production and expanding the conditions in which the powder can be used to apply a coating.

Comparisons of coatings produced using pre-alloyed YSZ powder according to the invention with conventional spray dried or fused and crushed YSZ powders indicates the powder according to the present invention produces a coating with more consistent and uniform microstructures, lower thermal conductivity, improved thermal shock resistance, and more uniform porosity levels.

BRIEF DESCRIPTION OF THE FIGURES

The foregoing and other features of the present invention will be more readily apparent from the following detailed description and drawings of illustrative embodiments of the invention in which:

FIG. 4 is a graph of the thermal conductivity vs. temperature of the coatings shown in FIGS. 1–3.

DETAILED DESCRIPTION OF THE PREFERRED EMBODIMENT(S)

Figure 1:
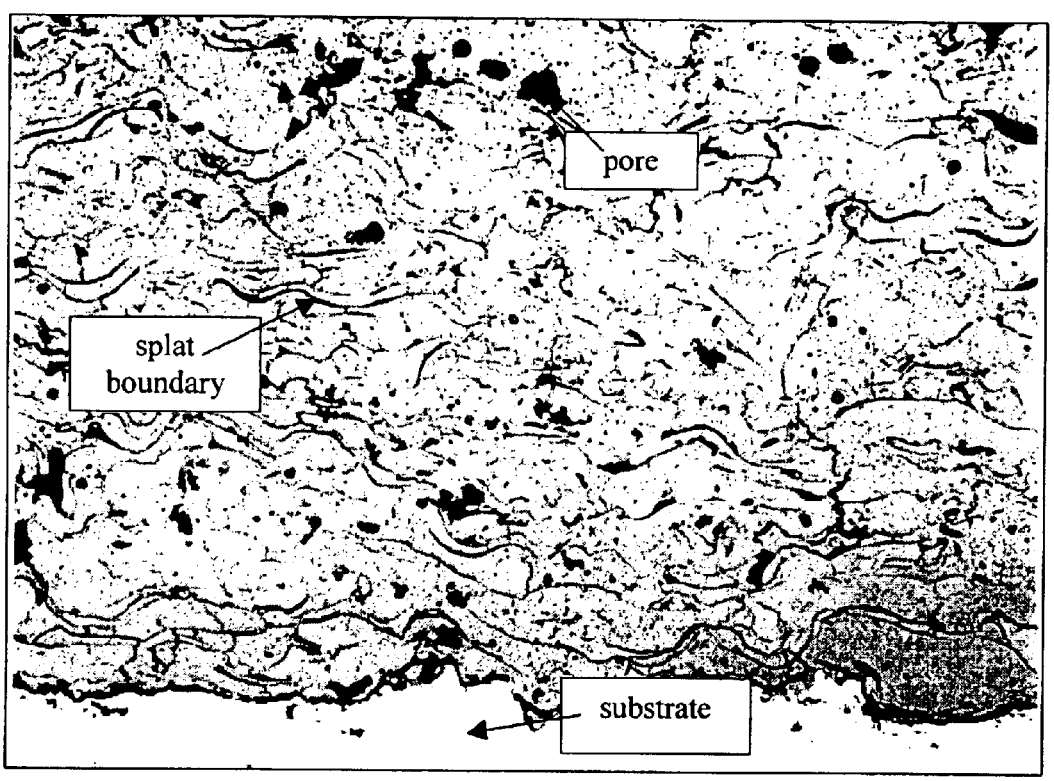
FIG. 1 is a microphotograph of a cross-section of a YSZ coating formed using a HOSP powder.

A prealloyed YSZ powder for use in spray application of thermal coatings is produced by first alloying zirconia with a stabilizer such as yttria, grinding, milling, or otherwise processing the material to produce a very fine powder having an average particle size of about one order of magnitude smaller than the desired sized particle for use in the spray application, and then processing the alloyed powder using spray drying techniques to produce the prealloyed YSZ powder with a size range that can easily be thermal sprayed.

More specifically, zirconia is initially provided typically in powder form and is alloyed with a stabilizer. The zirconia is preferably stabilized with yttria in the range of between about 5–25% by weight, more preferably between about 6–10% and most preferably about 8%. In alternative embodiments, one or more other materials can be used to stabilize the zirconia in addition to, or in place of yttria For example, the yttria can be replaced or supplemented by ceria, magnesia, ytterbia, scantia, dysprosia, neodyrnia, and calcia.

Conventional techniques can be used to alloy the zirconia with the stabilizer, such as induction arc processing. It is known to alloy zirconia with yttria and then grind the alloyed material to a particle size suitable for use in thermal spray coating applications. Typical thermal spray coating particle sizes range from between about 11 and 150 microns. In contrast, and according to the present invention, the alloyed stabilized zirconia is processed to form a base powder having particle sizes that are much smaller than is typically used for spray applications, generally in the range of one order of magnitude smaller than desired for the thermal spray coating process. In a preferred embodiment, the alloyed powder has a particle size of less than or equal to about 10 microns.

The alloyed zirconia power is then subjected to a spray-drying process during which the very finely ground base powder is mixed in a slurry with water and an organic binder and then spray dried to produce a pre-alloyed powder having generally spherical particles of sizes suitable for thermal spray applications. The spray-dried powder can be screened to the desired particle size. In one embodiment, the dried powder is screened to provide particles sized between about 11 and 150 microns.

Various conventional spray dry processes known to those of skill in the art can be used. In a particular embodiment, a slurry, or slip, is formed of the base alloyed zirconia powder, an organic binder, and a suitable liquid, preferably deionized water. The preferred binder used is CMC (carboxymethylcellulose). However, other binders known to those of skill in the art, such as PVA (polyvinylalcohol) or MC (methylcellulose), can alternatively be used. In a preferred embodiment, the slurry has between about 1% and 10% of binder by dry weight, preferably on the order of about 2%, relative to the weight of base powder in the slurry The viscosity of the slurry affects the size of the spray-dry particles and the viscosity can easily be adjusted prior to spray drying by adding additional water (or other suitable liquid) until the desired viscosity is reached. A dispersing agent, such as Nopcosperse, can also be added to aid in producing a uniform particle suspension in the slurry. Preferably, about 2% by dry weight of the suspension agent relative to the base powder is added to the slurry.

The powder produced according to the present method can be used to apply thermal spray coatings. It has been found that, when compared to comparable coatings formed using prior art powders, the pre-alloyed powder produces coatings with unexpectedly better porosity distribution and a higher amount of splat boundaries, and thus a substantially lower thermal conductivity. A particular example is discussed below.

A first thermal spray coating was produced using a conventional plasma densified powder known as a hollow spherical powder ("HOSP"). This class of powder is generally considered to produce superior coatings. The specific YSZ powder used is currently available as Sulzer Metco 204CNS. Two additional coatings were produced with a pre-alloyed YSZ powder, currently referred to as Sulzer Metco AE 8017 and produced according to the present invention. An analysis of the pre-alloyed and HOSP YSZ powders used is shown in Table 1, below:

TABLE 1

|  | pre-alloyed powder (−100, +200) | Standard HOSP powder |
|---|---|---|
| Sieve (Mesh) | | |
| +100 | 0.2 | 0.2 |
| +120 | 12.5 | 10.2 |
| +140 | 46.4 | 42.0 |
| +170 | 80.0 | 72.6 |
| +200 | 93.7 | 94.0 |
| +230 | 98.8 | 98.7 |
| +270 | 99.5 | 99.3 |
| +325 | 99.7 | 99.5 |
| −325 | 0.3 | 0.5 |
| Density (g/cm$^3$) | 1.15 | 2.17 |
| Organic Solids (wt. %) | 2.96 | <0.1 |
| Chemistry (wt %) | | |
| ZiO2 + HfO2 | 91.54 | 93.70 |
| Y2O3 | 7.87 | 7.50 |
| SiO2 | 0.06 | 0.30 |
| TiO2 | <0.01 | 0.03 |
| Fe2O3 | <0.01 | 0.02 |
| Al2O3 | <0.01 | <0.01 |
| CaO | 0.01 | 0.01 |
| MgO | 0.07 | <0.01 |
| U + Th | <0.01 | 0.02 |
| Monoclinic ZrO2 | 6% | 4% |

As can be seen, the overall composition of the two powders is substantially the same. The major difference is that the HOSP powder has a substantially higher density, the result of the plasma densification process used to alloy the zirconia with the yttria. In contrast, the prealloyed YSZ powder is much more porous, being comprised of very small particles held together by the binder. The binder in the pre-alloyed powder also introduces organic solids which are largely absent in the HOSP powder.

The three coatings were all applied using a Sulzer Metco 9MB spray gun under N2/H2 conditions. The process parameters were selected to produce a coating having a porosity of about 11%. The only difference between the pre-alloyed coating process parameters was spray distances. Pre-alloyed coating A was sprayed at a distance of 4.5 in. and pre-alloyed coating B was sprayed at a distance of 5.5 in. Two distances were selected to account for possible differences in porosity. The three coatings were then cross-sectioned and polished for analysis.

Figure 2:
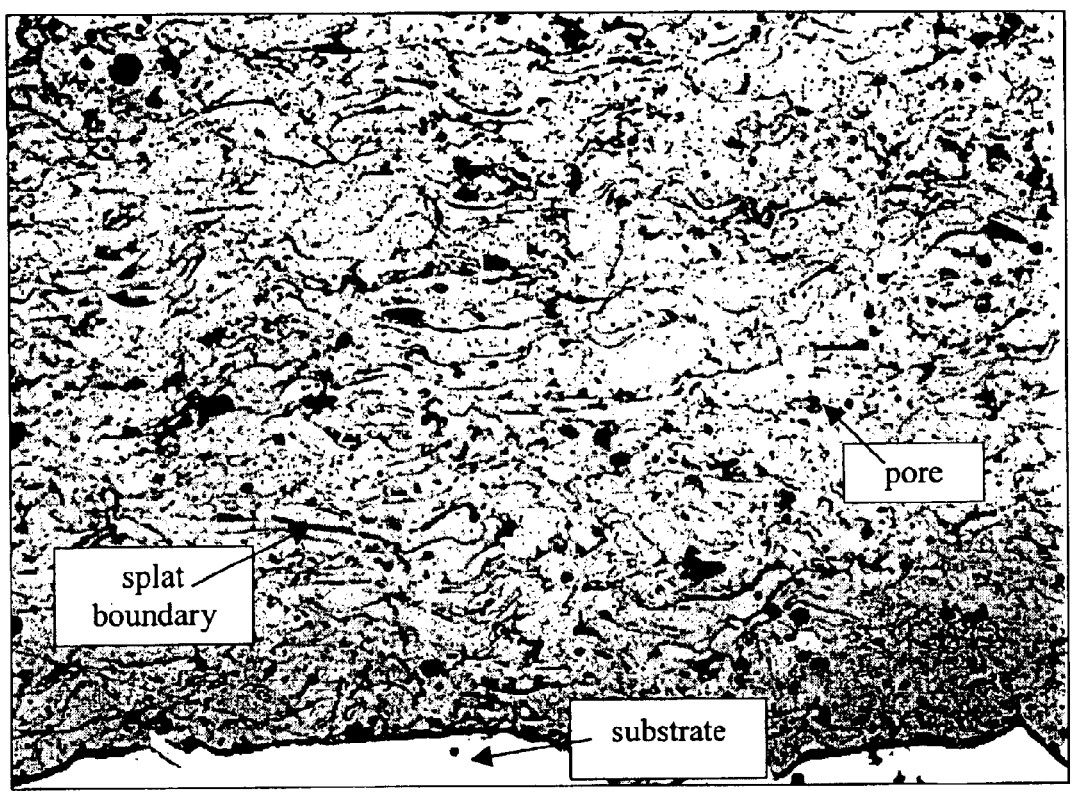
FIGS. 2 and 3 are microphotographs of cross-section of YSZ coatings formed using a pre-alloyed YSZ powder.
Figure 3:
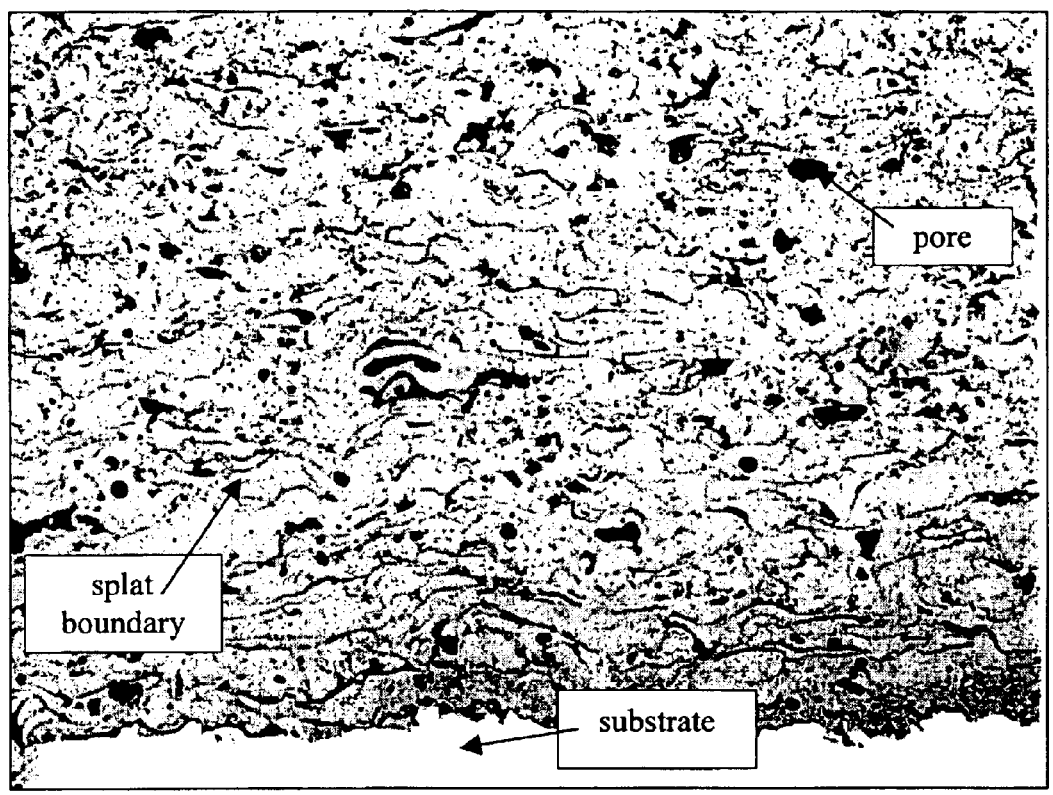

Microphotographs of cross sections for the HOSP coating, pre-alloyed coating A, and pre-alloyed coating B along with porosity measurements are shown in FIGS. 1–3. Each microphotograph shows the various splat boundaries and pores in the sample. While the aggregate porosity levels for the three coatings are similar, the morphology is different. In particular, the coatings produced with the pre-alloyed powder have more defects, such as splat boundaries, and have pores that are more evenly distributed and finer than those in the HOSP coating do. Empirically, the increase in and finer distribution of defects in the pre-alloyed coating indicates that the pre-alloyed coating has a shorter mean-free-path of lattice waves and a lower thermal conductivity relative to the HOSP coating.

The thermal conductivity of each of the three coatings was then analyzed. For accuracy, the characteristics of each coating were measured on a metal substrate and also on a freestanding shape. Prior to testing, the freestanding samples were coated with 0.1 micrometer of gold and all samples were coated with approximately 5 micrometers of graphite. The freestanding samples were further polished to remove the lip from the edges on the substrate side and to smooth the roughness on the free side.

The specific heat and diffusivity for each sample was measured at 25,500, and 1000° C. by the laser flash method using a Holometrix Thermaflash 2220 and the results used to determine thermal conductivity. The results of the test are shown in Table 2, below. A graph of the thermal conductivity vs. temperature is shown in FIG. 4

TABLE 2

Laser Flash Thermal Conductivity Results

| Sample | thickness @ 25° C. (mm) | bulk density p @ 25° C. (g/cm$^3$) | temperature (° C.) | specific heat Cp (J/g-K) | diffusivity α (cm$^2$/s) | conductivity λ (W/m-K) |
|---|---|---|---|---|---|---|
| HOSP (free-standing) | 0.443 | 4.81 | 25 | 0.458 | 0.00280 | 0.617 |
| | | | 500 | 0.596 | 0.00213 | 0.611 |
| | | | 1000 | 0.638 | 0.00176 | 0.540 |
| Pre-ALLOY A (free-standing) | 0.602 | 4.84 | 25 | 0.453 | 0.00216 | 0.473 |
| | | | 500 | 0.596 | 0.00144 | 0.416 |
| | | | 1000 | 0.634 | 0.00129 | 0.397 |
| (free-standing) | 0.542 | 4.75 | 25 | 0.457 | 0.00214 | 0.465 |
| | | | 500 | 0.598 | 0.00146 | 0.413 |
| | | | 1000 | 0.638 | 0.00124 | 0.375 |
| Inconel 718 (substrate) | 2.535 | 8.20 | 25 | 0.433 | 0.0289 | 10.3 |
| | | | 500 | 0.548 | 0.0416 | 18.7 |
| | | | 1000 | 0.674 | 0.0496 | 27.4 |
| HOSP (coating on Inc718) | 0.315 | 4.81 | 25 | 0.458 | 0.00289 | 0.635 |
| | | | 500 | 0.596 | 0.00202 | 0.578 |
| | | | 1000 | 0.638 | 0.00180 | 0.551 |
| Pre-ALLOY A (coating on Inc718) | 0.533 | 4.84 | 25 | 0.453 | 0.00219 | 0.480 |
| | | | 500 | 0.596 | 0.00148 | 0.428 |
| | | | 1000 | 0.634 | 0.00139 | 0.427 |
| PRE-ALLOY B (coating on Inc718) | 0.508 | 4.75 | 25 | 0.457 | 0.00224 | 0.486 |
| | | | 500 | 0.598 | 0.00151 | 0.429 |
| | | | 1000 | 0.638 | 0.00133 | 0.404 |

As confirmed by the analysis, the pre-alloyed coatings, while having the same aggregate composition and porosity as the HOSP coating, have a thermal conductivity which is approximately 20% lower than the standard YSZ material. This is a substantial performance increase which will provide better heat protection for a constant coating thickness when compared to conventional YSZ coatings or permit the same heat protection to be achieved with a thinner, and therefore less expensive, coating.

While the invention has been particularly shown and described with reference to preferred embodiments thereof, it will be understood by those of skill in the art that various changes in the form and details may be made therein without departing from the spirit and scope of the invention.

What is claimed is:

1. A method of producing a pre-alloyed stabilized zirconia powder comprising the steps of:
    alloying zirconia with a first stabilizer comprising yttria and a second stabilizer selected from the group of ceria, magnesia, ytterbia, scantia, dysprosia, neodymia, and calcia;
    powderizing the alloyed stabilized zirconia;
    spray-drying the stabilized zirconia powder to produce an agglomerated powder having an average particle size suitable for use in spray coating applications.

2. The method of claim 1, wherein the yttria is present in a quantity of between about 6% and 10% relative to the zirconia.

3. The method of claim 2, wherein the yttria is present in a quantity of about 8% relative to the zirconia.

4. The method of claim 1, wherein at least a substantial portion of the stabilized zirconia powder comprises particles having a size of no more than about an order of magnitude smaller than an average particle size of the agglomerated powder.

5. The method of claim 1, wherein the stabilized zirconia powder has an average particle size of no more than about 10 microns.

6. The method of claim 5, wherein the agglomerated powder has an average particle size in the range of between about 11 and 150 microns.

7. The method of claim 1, wherein the second stabilizer comprises ceria.

8. The method of claim 1, wherein the second stabilizer comprises ytterbia.

9. The method of claim 1, wherein the second stabilizer comprises magnesia.

10. The method of claim 1, wherein the second stabilizer comprises scantia.

11. The method of claim 1, wherein the second stabilizer comprises dysprosia.

12. The method of claim 1, wherein the second stabilizer comprises neodymia.

13. The method of claim 1, wherein the second stabilizer comprises calcia.

* * * * *